United States Patent [19]

Shankar et al.

[11] Patent Number: 4,933,897
[45] Date of Patent: Jun. 12, 1990

[54] METHOD FOR DESIGNING A CONTROL SEQUENCER

[75] Inventors: Kapil Shankar; Om Agrawal, both of San Jose, Calif.

[73] Assignee: Advanced Micro Devices, Inc., Sunnyvale, Calif.

[21] Appl. No.: 356,107

[22] Filed: May 24, 1989

Related U.S. Application Data

[62] Division of Ser. No. 827,840, Feb. 7, 1986, Pat. No. 4,876,640.

[51] Int. Cl.$^5$ .......................... G06F 1/00; G06F 7/38; H03K 19/173
[52] U.S. Cl. .................. 364/900; 364/942.7; 364/927.8; 364/965; 307/465
[58] Field of Search ............... 364/200, 300, 900; 307/465

[56] References Cited

U.S. PATENT DOCUMENTS 4,519,033 5/1985 Vaughn et al. .................. 364/200
4,858,178 8/1989 Breuninger .................... 307/465 X

OTHER PUBLICATIONS

Hicks, D. R., "Sequence Controller Using Programmable Logic Array", *IBM Tech. Disc. Bull.*, vol. 20, No. 2, Jul. 1977, pp. 743–744.

*Primary Examiner*—Raulfe B. Zache
*Attorney, Agent, or Firm*—Salzman & Levy

[57] ABSTRACT

A method for designing a control sequencer having a high level counter element and a programmable AND array suitable for control applications. The method utilizes high level constructs bearing a one-to-one relationship to the architecture of the apparatus so that the design of the controller is facilitated resulting in a rapidly-executed program which is easy to comprehend, verify and document. Moore and Mealy state machines are readily implemented by the controller by virtue of its programmable AND array and counter which allow the next-state and output to be based on the contents of the counter as well as any set of input signals. Conditional testing can be made entirely state dependent, partially-state dependent, or state-independent. Multiway branching is also readily implemented since the presence of the programmable AND array allows the user to specify a number of sets of input conditions, so that from a given state, as determined by the counter contents, each set of input condition gives rise to a transition to a specified next state. Instruction decoding for the controller is preformed in the programmable AND array, and thus can be specified by the designer in the high-level software method of the invention. Accordingly, instructions can be stored in the AND array in a logical form directly usable by the hardware. The counter is preferably of the Gray-code type so as to minimize instabilities in the output signals and to permit easy optimization of Boolean expressions involving the state of the device. Dedicated buried registers are provided as are dedicated feedback paths from the outpout registers, dedicated registers and counter to the AND array. Two separate OR arrays are provided, one generating output signals, the other generating control sequencing signals.

16 Claims, 3 Drawing Sheets

METHOD FOR DESIGNING A CONTROL SEQUENCER

CROSS-REFERENCE TO RELATED, COPENDING APPLICATION

This patent application is a divisional application of copending application, Ser. No. 06/827,840, filed Feb. 7, 1986 for "Logic Controller Having Programmable Logic "AND" Array Using a Programmable Gray-Code Counter" now Pat. No. 4,876,640 issued Oct. 24, 1989 and assigned to the present assignee.

Related, copending application of particular interest to the instant application is U.S. Ser. No. 795,159, entitled "Programmable Logic Cell with Flexible Clocking and Flexible Feedback", filed Nov. 5, 1985, on behalf of Om Agrawal, Kapil Shankar and Fares Mubarak now U.S. Pat. No. 4,771,285, and assigned to the assignee of the instant application.

FIELD OF THE INVENTION

The present invention relates to programmable logic devices, and more particularly, to such devices suitable for use in control applications, for instance, as sequencers, and having easily-programmable high level logic elements such as counters.

BACKGROUND OF THE INVENTION

PAL and PLA Devices

The first step in designing a sequential digital circuit is to construct a "state diagram" indicating the state transitions and output signal resulting from the application of various input signals. A so-called "Moore" machine is one in which the output signals are dependent only on the state, while in a so-called "Mealy" machine, the output signals are dependent both on the state and the input signals. Presently, programmable array logic (PAL) devices, and programmable logic array (PLA) devices find application for controlling digital circuitry, such as in "state machines" or sequencers, requiring flexibility and ease of use.

Although such PAL/PLA devices operate with speed and flexibility, they are difficult to program, since they require writing complex Boolean expressions for this purpose. The use of Boolean equations to design the sequencer limits the number of variables available to the designer to eight because of the mathematical difficulties in specifying and simplifying equations having typically more than eight variables. Moreover, such sequencers require additional external circuitry to provide flexibility as well as additional conditional input testing circuitry.

Particular difficulty is encountered when programming and understanding a general PAL or PLA device used to perform higher level logical functions such as counting, state sequencing, branching, or multiple-case testing. No higher level logic blocks, especially program counters, are available in such devices which can be readily programmed or easily understood. The absence of these higher level logical blocks makes it very difficult to implement with PALs and PLAs sequencers and state machines with high level language-based state machine constructs. Also, lack of these high level logical blocks makes current PAL/PLA device architecture unoptimized for control logic applications.

While to reduce programming effort and to ease understandability, some higher level language (HLL) programming schemes may be used, there is no direct relationship between such HLL constructs and the underlying hardware. As such, no methodology is available which affords easy design of the microsequencer (because no high level constructs are readily available within the PAL- or PLA-based sequencers) corresponding to the high level language constructs most useful to design personnel. Complex, detailed and error-prone Boolean equations must be written presently to accomplish the design of PAL- or PLA-based sequencers. Such equations do not bear a one-to-one correspondence to the underlying circuit elements of the PAL- or PLA-based sequencer. Because of all these reasons, PAL/PLA devices are not used for large complex control applications.

PROM-Based Devices

Usually, programmable read-only memory (PROM)-based micro-coded sequencers are used for such control applications. One such device is illustrated in block diagram form in FIG. 1. However, such microsequencers have many deficiencies. For instance, to implement "conditional testing" for the construction of Moore and Mealy state machines, requires the use of a dedicated testing multiplexer (TEST MUX) element. However, the TEST MUX can use only one of the conditional test inputs it receives to determine the next state. Accordingly, in PROM-based microsequencers, it is not possible to perform multiple conditional testing in a single clock cycle. For example, to implement the following test at a state n:

STATE_n: IF (COND1) THEN OUTPUT X, IF (COND2) THEN OUTPUT Y; a PROM-based microsequencer requires two (sub) states, each testing a single condition: ·
STATE_n1: IF (COND1) THEN OUTPUT X;
STATE_n2: IF (COND2) THEN OUTPUT Y;

The resulting code is more complicated and slower to execute than need be, as it requires two clock cycles. Further, PROM-based microsequencers allow only state-dependent conditional testing. It is very difficult to perform state-independent conditional testing or conditional testing based on only a partial number of states, without wasting so-called "product terms", since PROM-based microsequencers allow only one product term per state.

For instance, the following example employs multiple condition testing for states n and n+1 only, i.e., a partial number of states:

| | |
|---|---|
| STATE_n: | IF (COND1) THEN OUT1, IF INITL THEN BOOT; |
| STATE_n+1: | OUT1, OUT11, IF INITL THEN BOOT; |
| STATE_n+m: | GOTO m; |

This example cannot be implemented in PROM-based microsequencers.

As a second example, the following instruction requires that if the "global" input INITL is asserted, the state machine should branch to START, independent of the present state:
IF (INITL) GOTO STATE (START);

This instruction is an example of state-independent branching and can only be implemented in micro-interruptible PROM-based microsequencers. This requires additional circuitry (not shown in FIG. 1) and imposes an undesirabale "exception-handling" technique for what should be a relatively straightforward state-independent operation.

Frequently, in microsequencer design, it is desirable to provide multiple branches from a given state to different states on different conditional input signals. In PROM-based microsequencers additional circuitry must be provided to perform this function. In PROM-based microsequencers, such as shown in FIG. 1, all product terms are predecoded. The designer is therefore limited to branches to only one location at a time. PROM-based microsequencers do not directly provide genuine "multiway" branching capability. Extra hardware elements, such as the BRANCH CONTROL LOGIC (GOTO) element shown in FIG. 1, used in conjunction with masking, is needed to provide limited multiway branching. The branching address is derived from the conditional (test) inputs along with a user-definable mask. This provides a jump to only a limited number of states selectable by masking of the inputs being tested as provided by the bit-by-bit "AND" function.

For example, to implement the multiway branch STATE_n IF (COND1) THEN OUT1, IF (COND2) THEN OUT2; requires in a PROM-based microsequencer the statements

| STATE_n | GOTO (CONDITIONAL INPUTS "AND" MASK) |
|---------|--------------------------------------|
| STATE_m | OUT1 |
| STATE_p | OUT2 | in which the MASK is chosen to cause generation of the address for STATE_m when the CONDITIONAL INPUTS correspond to COND1, and the STATE_p when the CONDITIONAL INPUTS correspond to COND2.

As will be appreciated by those skilled in the art, such techniques undesirably complicate the design of the microsequencer, and in any case, additional conditional testing circuitry must be provided to perform these operations. Such circuitry takes valuable die area, leads to slower execution times, and makes sequencer design cumbersome.

In PROM-based microsequencers, as can be seen from the above discussion, "multiway" branching from a state can only be performed by executing either a series of single jumps or with additional logic circuitry. Such a limitation violates good structured program design which uses such high level language constructs as the IF THEN ELSE and CASE. Furthermore, such limitation slows execution times and makes program verification and documentation difficult.

In PROM-based microsequencers, instructions are stored in a logical data form:
OPCODE, COND_SELECT, BRANCH ADDRESS, OUTPUT.
Instruction decoding in PROM-based microsequencers is accomplished at execution-time by MICROINSTRUCTION DECODE PLA which is hardwired to the various elements of the microsequencer shown in FIG. 1. This PLA receives the operation code (opcode) of an instruction from the pipeline register, decodes it, and generates, over time, a series of control signals which cause the various elements within the microsequencer, such as the branch control logic, test multiplexer, program counter multiplexer (PC MUX), microprogram PROM, pipeline register, shift registers, and the like, to undertake and coordinate their respective functions. Also, in PORM-based microsequencers, separate instruction decode logic circuitry is required and the user is restricted to the fixed instruction operation codes defined by the manufacturer of the device. The fixed-instruction decode PLA severely limits the flexibility of usage, and imposes additional instruction decoding time for each microcycle. PROM-based microsequencers have fixed AND arrays to perform addressing. The overall preformance and speed of the microsequencer of FIG. 1 is thereby degraded.

Similar to conditional testing and branching, instruction execution is also state dependent only. PROM-based microsequencers do not provide state independent conditional testing, branching or instruction decoding.

Furthermore, even when specific output signals do not change for several clock cycles, the output signal must be held constant. In PROM-based microsequencers, this requirement means that product terms are generated every clock cycle thereby wasting PROM product terms. Also PROM-based microsequencers waste product terms when executing branches.

Further, no internal feedback paths are provided to apply output signals generated by PROM-based microsequencers to the PROM array. Also every state product term drives all the outputs of a PROM-based microsequencer which has an adverse affect on the speed of the device.

In summary, PROM-based microsequencers do not provide adequate high level constructs for state machine/sequencer design, limit design instructions to one construct per line, and impose fixed opcodes thus making customization of user-specific software difficult. Their architecture, while related, is not optimized to the higher level constructs which designers prefer to use.

SUMMARY OF THE INVENTION

It is an object of the instant invention to provide a programmable logic controller (PLC) device having high level circuit elements which can be used in conjunction with a design methodology allowing development of software having high-level language constructs for programming the controller, the constructs bearing a one-to-one relationship to the underlying architecture of the PLC device.

It is another object of the PLC of the instant invention to employ architecture providing faster instruction sequencing than is available from PROM-based microsequencers.

It is yet another object of the instant invention to allow development of software sequencing customized to particular applications.

It is another object of the PLC of the instant invention to employ an architecture enhancing fast control sequencing by eliminating stages in the instruction execution cycle, such as instruction decode.

It is yet another object of the instant invention to eliminate circuit elements required in PROM-based microsequencers, such as test multiplexers, instruction decode PLA, counter multiplexers, and the like.

The programmable logic controller (PLC) of the present invention is specifically tailored for control applications both from the functionality and usage point of view. The PLC offers substantial advantages over the conventional PALs/PLAs and PROM-based microsequencers used for control applications. It offers a generic superset of PROM-based microsequencer functionality and flexibility. Also it provides for the use of higher level language constructs, in place of boolean equations or microcode. It is actually a "software sequencer" as its instruction decode is programmable in software. Also for the same functionality, the PLC device requires less silicon, and offers higher speed than PROM-based microsequencers.

In a PLC, a set of output registers along with a counter and a set of general purpose buried registers constitute the counterpart to the pipeline register of PROM-based microsequencers. The counter in a PLC design provides the functionality analogous to a program counter in the PROM-based microsequencer design. It also provides the jump address field of the PROM-based microsequencer pipeline register. Further, in a PLC device of the present invention, a programmable AND array, performs the addressing functions of PROM-based microsequencers. In a PLC of the present invention, these combinations provide extra flexibility in control and reduced silicon die area as the AND array is programmable, and the jump address needs to be generated only when required.

The extra logic circuitry required in a PROM-based microsequencer, such as a program counter multiplexer, branch control logic, test multliplexer, instruction decode, and count register, is not required in a PLC. In addition to addressing, the AND array performs instruction decode, conditional testing, branch address generation and a number of miscellaneous functions. A PLC of the instant invention inherently provides a superset of the functionality provided by these redundant logic blocks in microsequencers. The PLC provides improved functionality, ease of use, faster speeds and lesser silicon for the same functionality as compared to prior art microsequencers.

Provided in one embodiment of a programmable logic controller of the instant invention, is a combinatorial logic circuit comprising a programmable AND array and a pair of programmable OR arrays. A first OR array generates logic signals to a set of output macrocells served by a set of input/output pins. A second OR array generates logic signals to a set of "buried" internal registers and a counter. The second OR array provides a high level logic control sequencing function. The signals generated by certain ones of the output macrocells as well as the internal registers and the counter are fedback to the AND array via dedicated internal feedback paths.

In the PLC of the instant invention, "conditional testing" is performed within the programmable AND array, and therefore is entirely user-determinable. Any set of product terms may be specified by the user in the design of Moore or Mealy state machines. Furthermore, because such testing is done by the AND array, no additonal circuitry, nor the accompanying complexity, die size and time penalties, is present in the PLC of the instant invention. Because of the flexibility of this conditional testing, software sequencing is more transparent and quicker executing. For instance, where a PROM-based microsequencer may require three states to perform the requisite testing, the PLC of the instant invention only requires one state.

Provision of a counter within the PLC allows the "product terms" (states), generated by the AND array to be based on the contents of both the counter as well as the input signals. Furthermore, the resulting conditional testing capability of the PLC eliminates the need for a test multiplexer, a test mask, the program counter multiplexer, the control multiplexer and the branch control logic which also saves die area. In addition, the PLC affords state-dependent, state-independent and partial-state-dependent multiple conditional branching.

The PLC of the instant invention supports true multiway branching because of the presence of the programmable AND array. Provision of the counter, in conjunction with the product terms generated by the AND array, permits multiple next-state product terms to be generated thereby from a single present state. High level language constructs such as IF THEN ELSE and CASE can be employed by the designer to take advantage of this architecture. The resulting code will bear a direct relationship to the underlying architecture and accordingly will be easier to develop and be more readily understood and documented when completed. In addition, relative branching, branch to location defined by input signals, and interrupts are readily implemented in a PLC of the instant invention because of provision of the user-programmable AND array.

The PLC provides the capability of multiple branching on multiple test conditions without the additional branch control logic, test multiplexer, and the like, of the prior art PROM-based microsequencers. As instruction decoding is performed in the user-programmable AND array, the decoding of each instruction can be specified in software by the designer. Hence in the PLC device, instructions are predecoded according to their software specification and stored in the AND array in a logical format directly usable by the hardware. This is far more efficient than storing instructions in the PROM microprogram memory in a data format and utilizing a separate instruction decode PLA to decode them. Thus the PLC device eliminates the need for the dedicated instruction decode PLA of the prior art, and results in savings in die area, instruction execution time and offers substantial flexibility. With the PLC device, the designer can use software having high-level constructs which are easy to comprehend and do not impose unnecessary restrictions such as requiring typically no more than eight to sixteen variables in Boolean design expressions.

Because of the provision of the programmable AND array, the PROM-based microsequencer's restriction of one instruction per state is not imposed by the PLC of the present invention. Instructions corresponding to a particular state may be cascaded and instruction sequences may be customized and/or optimized by the user for particular applications. Hence, a PLC will perform instruction sequences more quickly than a PROM-based sequencer and the resulting code will be easy to understand. Furthermore, most PROM-based microsequencers require an instruction field within the pipeline register for storing a branch address. As these sequencers have no programmable AND array, the separate branch field and a program counter are required for branching control. In a PLC, the provision of the programmable AND array allows branch control signals to be generated within the AND array and because of the presence of the counter having load control signals generated by the programmable OR array, the PLC does not need a separate branch field and program counter, resulting in saving of die area and a more transparent architecture.

The PLC of the instant invention, provides dedicated feedback paths from the output terminals and output macrocells. The feedback paths eliminate this need for separate product terms for each state for implementing hold, release, and delay functions, thereby saving product terms. Further, the signals generated at the outputs of the PLC can be either registered or combinatorial, active HIGH or active LOW. These capabilities are not available in prior art PROM-based microsequencers. The capability of combinatorial outputs allows both Mealy and Moore type state machine designs, whereas prior art PROM-based microsequencers implement only Moore type state machines.

Because PROM-based sequencers use a fully predecoded AND array, output signals generated thereby cannot be independent of state. "Interruptible" microsequencers are sometimes constructed to provide limited state-independent functions, by employing excessive external circuitry. The provision of a user-programmable AND array in the PLC of the instant invention permits providing state-independent functions and partial-state dependent functions, without the use of complex interrupt-driven opcodes and external circuitry.

By providing a programmable AND array in the PLC receiving external input signals, feedback signals, and state count signals, the additional information supplied in PROM-based sequencers, such as the use of a conditional test multiplexer, the opcode and constant instruction fields, are unnecessary. The AND array can be programmed, in conjunction with the programmable OR array, to generate the required control signals. Furthermore, the number of OR terms dependent on a single product term is quite critical. For enhanced speed, it is important to reduce the size of the OR array so as to eliminate the second gate delay as much as possible. A PLC of the instant invention employs two OR arrays, each performing a dedicated function, either output generation, or sequencer control, thereby reducing the size of each OR array without loss of functionality.

In an alternative embodiment, a faster PLC employs a combinatorial logic circuit comprising a programmable AND array and fixed OR arrays.

DETAILED DESCRIPTION OF PREFERRED EMBODIMENT

Figure 2:
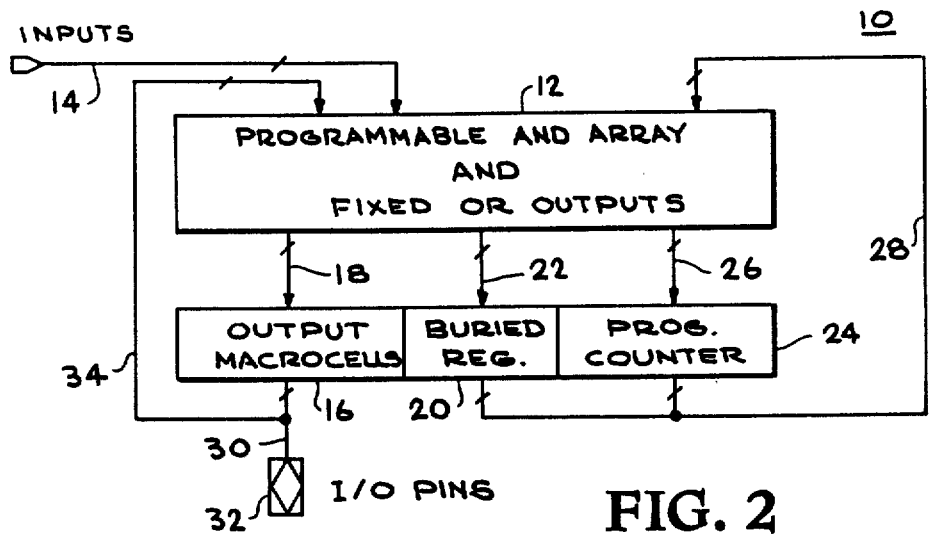
FIG. 2 illustrates the architecture of a programmable logic controller (PLC) according to the instant invention.

An architecture of a programmable logic controller (PLC) 10 according to the present invention is illustrated in FIG. 2. A fuse-programmable combinatorial logic circuit 12 receives input signals from an external source via a set of eight signal lines 14. On the drawing figures, various signal lines are hashmarked, with a numeral adjacent thereto, indicating that a number of signals are conducted in parallel on the line, even though only one line is shown, the numeral specifying the number of parallel signals. Accordingly, line 14 has the numeral "8" adjacent to a hashmark intersecting line 14. The programmable combinatorial logic circuit 12 can be formed from programmable AND and OR arrays as will be described in detail hereinafter.

A set of twelve output macrocells 16 receives signals generated by circuit 12 via signal lines 18, as does a set of four buried registers 20 via signal lines 22.

A programmable counter 24 also receives signals generated by circuit 12 via signal lines 26. These signals represent load address and counting control information, as will be described in detail below in connection with counter 24. Signals representing the contents of the buried registers 20 and the program counter 24 are conducted back, via signal lines 28, to the programmable combinatorial circuit 12 where they form a second input to circuit 12.

Signals representing the contents of output macrocells 16 are conducted via signal lines 30 to input/output (I/O) pins 32 as well a being conducted back via signal lines 34 to combinatorial circuit 12 where they form a third input to circuit 12. The counter 24 is preferably a Gray-code counter. Since the contents of such a counter changes in only one bit location, state transitions are not subject to instabilities which may cause transient errors in the signals generated at I/O pins 32. Furthermore, this results in improved optimization of the Boolean design equations, since adjacent state product terms involve differences of only one bit, as will be appreciated by those skilled in the art.

Briefly, data signals and dynamic control signals generated by the combinatorial logic circuit 12 are conducted to each of the output macrocells 16 and the macrocell generates a signal therefrom which may be selected from the contents of a register within macrocell 16, or the combinatorial data signal received from circuit 12 and causes this signal, in either an active HIGH or active LOW polarity to be conducted to I/O pin 32 for output and feedback to circuit 12, or the macrocell may cause a signal applied at I/O pin 32 to be conducted via signal lines 30 and 34 to the logic circuit 12. Each buried register 20, also receives data and dynamic control signals from the logic circuit 12 but is not allocated an I/O pin on which the contents of the register can be generated, however, a signal representing the contents of the register is conducted via feedback path 28 to the logic circuit 12 where it can be used for "state" determination.

The contents of the program counter 24 is similarly fedback to the logic circuit 12 for use in "state" determination and, since the external input signals are also available for logic circuit 12, implementation of both a "Mealy" state machine, in which the next-state determination is based on the current state and the inputs, and a "Moore" state machine, based solely on the current state, is readily performed by the PLC 10 of the present invention. The counter 24 can also perform sequencing functions and is readily controlled via the programmable logic circuit 12. The counter 24 receives a LOAD CONTROL signal generated by circuit 12 and a set of LOAD ADDRESS signals which, upon application of the LOAD CONTROL signal, permits setting of the contents of counter 24 to a programmable "state". Loading of the counter in this manner provides a "state branching" function of the PLC 10. Alternatively, by permanently setting the LOAD CONTROL signal HIGH, the counter 24 can function as a set of extra buried registers. Counter 24 also receives a COUNTER CLEAR (CLR) signal from logic circuit 12, which, when asserted, rests the counter to a predetermined "start" state, such as "OO" Hex.

Most microsequencers employ a pipeline register with an instruction field which defines the branch address. As the AND array is not programmable in a PROM-based microsequencer, a separate branch field and program counter are required. In a PLC 10 of the instant invention, the programmable logic circuit 12 performs instruction decoding and branch control signals can be generated by the circuit 12 itself. As such, LOAD ADDRESS and LOAD control signals can be generated directly for use by the program counter 24 of the PLC 10 instant invention.

Figure 3:
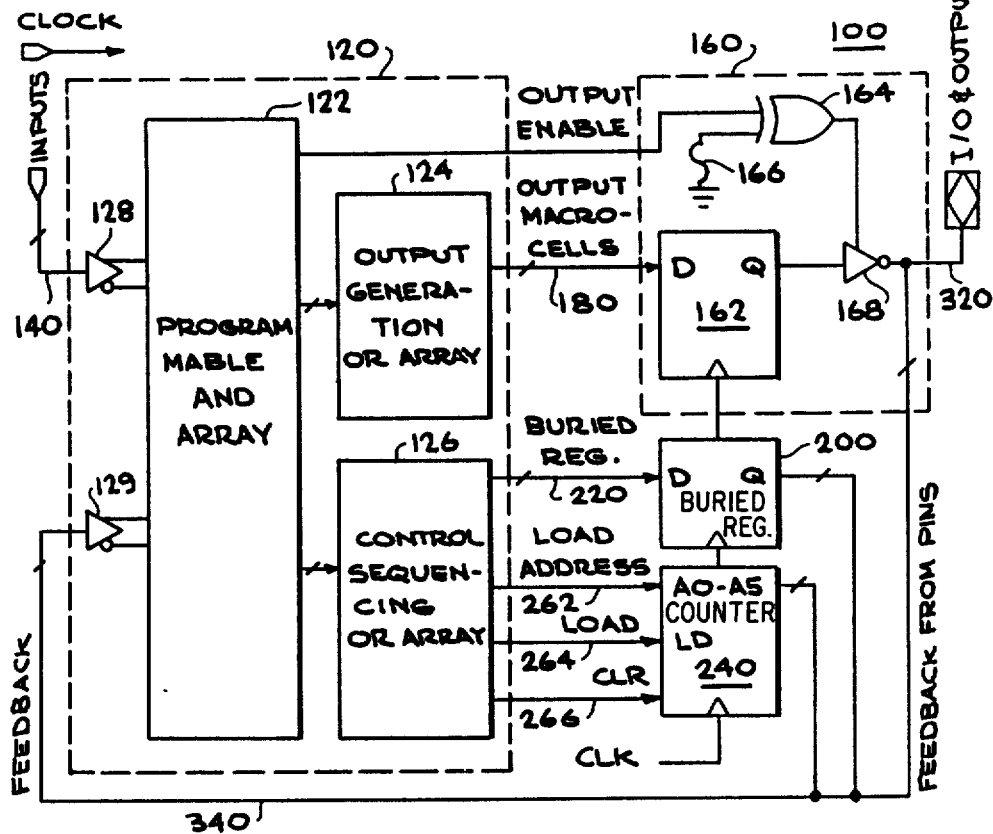
FIG. 3 is a block diagram of an embodiment of a PLC having a programmable AND array and a pair of programmable OR arrays.

With reference to FIG. 3, a particular implementation of a PLC 100, a programmable AND array 122 and a pair of programmable OR arrays 124 and 126 form the programmable combinatorial logic circuit 120, corresponding to the logic circuit 12 in FIG. 2. Such a combinatorial logic circuit is referred to as a programmable logic array (PLA) in the art.

Numerals of elements in FIG. 3 have a suffix of "0" appended to the numeral of the like element in FIG. 2. As shown in FIG. 3, the programmable AND array 122 receives the external inputs via signal lines 140 terminating at a buffer 128 providing true and complemented versions of the external input signals conducted to the AND array 122. An "output generation" OR array 124 receives so-called "product term" signals from AND array 122 and generates therefrom data and dynamic control signals received via signal lines 180 by a register 162 within the output macrocells 160. A "control sequencing" OR array 126 receives product term signals from AND array 122 and generates therefrom data and dynamic control signals received via signal lines 220 by the buried registers 200, and LOAD ADDRESS signals and LOAD CONTROL signals received via signal lines 262 and 264, respectively, by the counter 240. The COUNTER clear (CLR) signal is also generated by OR array 126 and received via signal line 266 by counter 240.

An output enable signal generated by AND array 122 is conducted to a first input terminal of an exclusive OR (XOR) gate 164. A field-programmable fusible link 166 is connected to a second input terminal of XOR gate 164. The status of fuse 166, blown or intact, determines the polarity of the output enable signal conducted to a control input terminal of an inverting output buffer 168. Buffer 168 receives the signal generated by register 162 and upon reception of the output enable signal, causes the contents of register 162 to be conducted at an output terminal of buffer 168. The signal so-generated is conducted to the I/O pin 320 and to the AND array 122, via feedback path 340. The contents of the buried registers 200 and the counter 240 are also conducted to the AND array 122, via feedback path 340. Path 340 terminates at a buffer 129 providing true and complemented versions of the feedback signals for the AND array 122.

If inverting output buffer 168 is disabled, external signals applied at I/O pin 320 can be conducted via feedback path 340 to the AND array 122.

The two OR arrays 124 and 126 provide distinct functions within the PLC 100. The output generation OR array 124 is used to generate "output" control signals dependent upon the "state" count and the input signals. The control sequencing OR array 126 is used to generate "internal" control signals for the buried register 200, the LOAD ADDRESS and the control signals, LOAD and CLR, for the counter 240. These two operations are essentially independent from one another, and thus provision of the two arrays reduces the size of the array in half, from that required by a single OR array, without adversely affecting the functionality of PLC 100.

A clock, not shown, provides a timing signal CLK received by the registers 162 and 200 and the counter 240, as will be appreciated by those skilled in the art.

Figure 4:
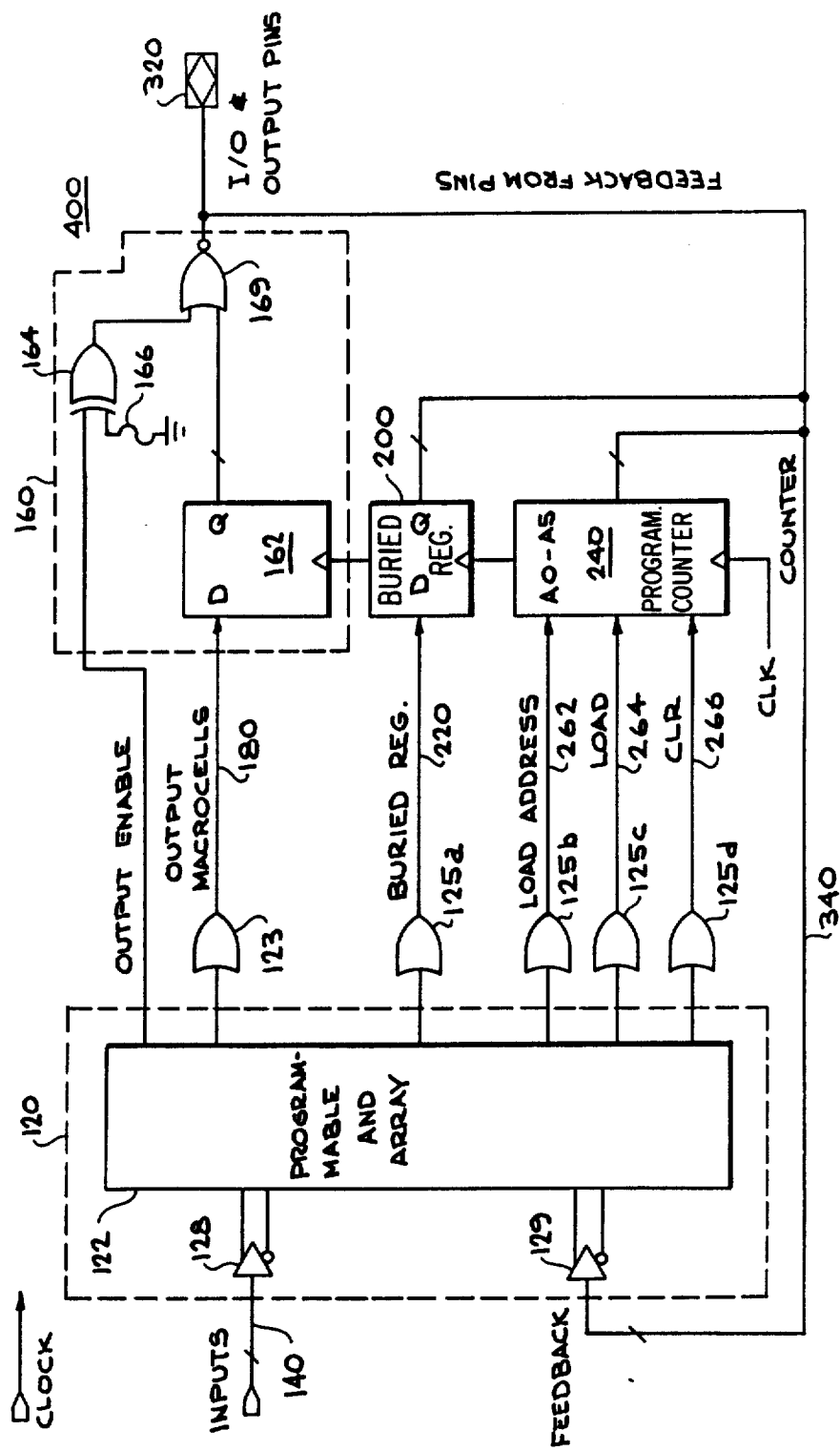
FIG. 4 is a block diagram of an embodiment of a PLC having a programmable AND array and fixed OR gates.

An alternative embodiment of a PLC according to the instant invention, employing fixed OR gates is shown in FIG. 4. A PLC 400, a programmable AND array 122 and a set of OR gates 123, 125a, 125b, 125c and 125d, form the programmable combinatorial logic circuit 120, corresponding to the logic circuit 12 in FIG. 2. Such a combinatorial logic circuit is referred to as a programmable array logic (PAL) in the art.

Numerals of elements in FIG. 4 have a suffix of "0" appended to the numeral of the like element in FIG. 2 and elements common to FIG. 3 have the same numeral in FIG. 4. As shown in FIG. 4, the programmable AND array 122 receives the external inputs via signal lines 140 terminating at a buffer 128 providing true and complemented versions of the external input signals conducted to the AND array 122. A set of "output generation" OR gates, of which one, 123, is shown, receives so-called "product term" signals from AND array 122 and generates therefrom data signals received via signal lines 180 by a register 162 within the output macrocells 160. A variable distribution of product terms is conducted to the OR gates, in this case, eight and ten.

A set of "control sequencing" OR gates, of which four, 125a, 125b, 125c and 125d are shown, receive a variable number of product term signals from AND array 122 and generates therefrom data and dynamic control signals received via signal lines 220 by the buried registers 200, and LOAD ADDRESS signals and LOAD CONTROL signals received via signal lines 262 and 264, respectively, by the counter 240. The COUNTER clear CLR signal is also generated by OR gate 125d and received via signal line 266 by counter 240.

An output enable signal generated by AND array 122 is conducted to a first input terminal of an exclusive OR (XOR) gate 164. A field-programmable fusible link 166 is connected to a second input terminal of XOR gate 164. The status of fuse 166, blown or intact, determines the polarity of the output enable signal conducted to a first input terminal of a NOR gate 169. NOR gate 169 receives at a second input terminal the signal generated by register 162 and upon reception of the output enable signal, causes the contents of register 162 to be conducted at an output terminal of NOR gate 169. The signal so-generated is conducted to the I/O pin 320 and to the AND array 122, via feedback path 340. The contents of the buried registers 200 and the counter 240 are also conducted to the AND array 122, via feedback path 340. Path 340 terminates at a buffer 129 providing true and complemented versions of the feedback signals for the AND array 122.

If NOR gate 169 is disabled, external signals applied at I/O pin 320 can be conducted via feedback path 340 to the AND array 122.

The two sets of OR gates 123 and 125a, 125b, 125c and 125d provide distinct functions within the PLC 400.

The output generation OR gates 123 are used to generate "output" control signals dependent upon the "state" count and the input signals. The control sequencing OR gates 125a, 125b, 125c and 125d are used to generate "internal" control signals for the buried register 200, the LOAD ADDRESS and the control signals, LOAD and CLR, for the counter 240. These two operations are essentially independent from one another, and thus provision of the two sets of gates reduces the number of gates, while the speed of PLC 400 is markedly increased compared with that of PLC 100.

A clock, not shown, provides a timing signal CLK received by the registers 162 and 200 and the counter 240, as will be appreciated by those skilled in the art.

Figure 1:
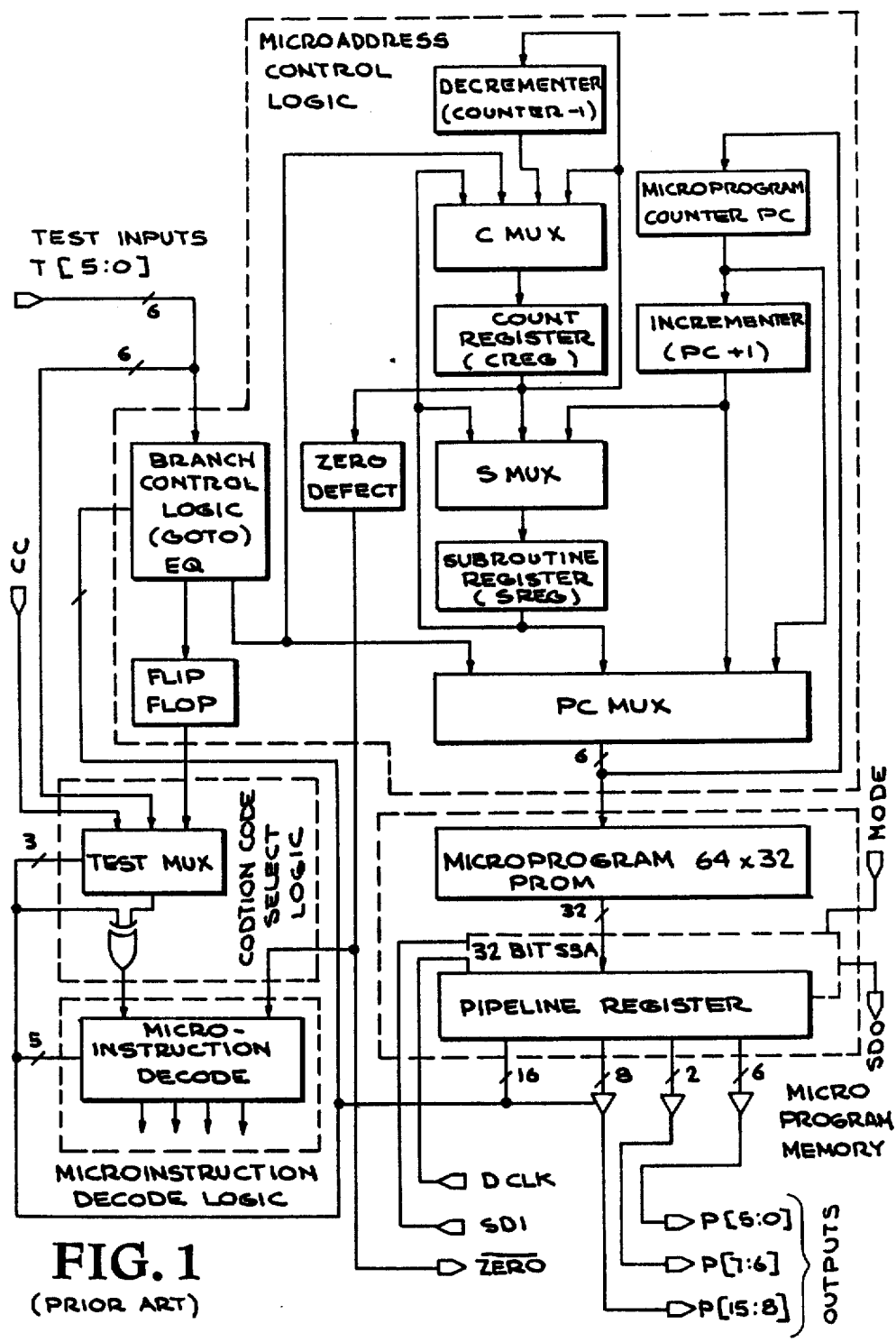
FIG. 1 is a block diagram of a PROM-based microsequencer of the prior art.

The programming of a PLC device 10 of the instant invention is preferably done via high level language (HLL) constructs. Provision of the high level logic counter element 24 within the PLC 10 facilitates this programming and the consequent understandability of the resulting program. An exemplary syntax is shown in the accompanying table.

using only one or two product terms generated within the PLA in conjunction with feedback signals. In some prior art sequencers (see FIG. 1), a separate count register (C-REG) and count multiplexer (C-MUX) is used to provide the hold function, thereby requiring extra die area and circuit complexity as well as programming complexity. The programmable AND array of the PLC eliminates the need for these elements, as well as their attendant liabilities. HOLD input and RELEASE input statements are also available which perform similar operations on input signals.

The high level language constructs IF ... THEN .. . ELSE, WHILE ... DO, FOR ... DO, CASE ... OF, GOTO and GOTOR are available to users of the PLC because of the provision of the programmable AND array and the state counter. The programmable AND array permits multiway branching from a given state, as described hereinbefore; and the state counter provides a direct correlation between the machine-state as used to design the software sequencer program and the contents of the state counter. Furthermore, the architecture

TABLE

Syntax of High Level Language

| Statement Type | Statement Name | Parameters | Meaning |
|---|---|---|---|
| DEFINE | INPINS | Signal Names | Define signal names |
|  | OUTPINS | Signal Names | Define signal names |
| STATEMENT | INPUT |  |  |
|  | PRIOR |  | Priority encoding of input signals |
|  | OUTPUT |  | Generate signals |
|  | OUTIN |  | Test Feedbaok signals |
|  | BURD n | Buried Register n | Test buried register signals/generate outputs |
|  | DELAY |  | Hold output signal(s) for certain number of clock cycles |
|  | HOLD | Inputs Only | Hold input signal(s) for certain number of clock cycles |
|  | RELEASE | Inputs Only | Release input signal(s) from hold |
|  | IF THEN ELSE | Statement Label(s) |  |
|  | WHILE DO | Statement Label(s) |  |
|  | FOR DO | Statement Label(s) |  |
|  | CASE OF | Statement Label(s) |  |
|  | GOTO | Statement Label | Direct Branch |
|  | GOTO | Statement Label | Relative Branch |
|  | ENABLE | Outputs Only | Enable Buffer |
|  | DISABLE | Outputs Only | Disable Buffer |
|  | RESET |  | Reset Register |
|  | PRESET |  | Preset Register |
|  | PRELOAD |  | Preload Register |

The meaning of most of the simple statements shown in the Table are self-explanatory to those skilled in the art. For instance, reference can be had to Chapter 4, "Design and Software for Programmable Logic", in the Programmable Array Logic Handbook by Advanced Micro Devices, Sunnyvale, CA c 1984. However, because of the various advantages of the PLC of the instant invention, several high level language constructs are supported by the PLC which are unavailable in the prior art. For example, the DELAY statement provides holding the signal generated at the output of the PLC constant for a specified number of clock cycles. In PROM-based sequencers, since all states are predecoded and the output signals are generated automatically at each clock cycle. Because of the presence of feedback paths in the PLC, a signal may be held by and the software syntax allow the designer to use system control signal names in the statements rather than predefined opcodes because of the predecoded Boolean expressions in software. These constructs are not available in the prior art because of their lack of high level elements.

The ENABLE, DISABLE, RESET, PRESET and PRELOAD statements are directly related to the PLC output buffer 168 and register elements. The former two statements being related to the output enable signal generated by the programmable AND array, as described hereinbefore in connection with XOR gate 164 and the latter three statements related to the resetting, presetting and preloading of output macrocells 16 and-/or the buried registers 20, that, although not illustrated in the figures, can be provided by reference to a related, copending application U.S. Ser. No. 795,159, entitled "PROGRAMMABLE LOGIC CELL WITH FLEXIBLE CLOCKING AND FLEXIBLE FEEDBACK", filed Nov. 5, 1985, on behalf of Om Agrawal, Kapil Shankar and Fares Mubarak now U.S. Pat. No. 4,771,285.

The high level language constructs illustrated in the Table can be translated into Boolean expressions and then used directly in conjunction with any of a number of current PAL design specification languages, such as PLPL, ABEL or CUPL, to aid in the programming of the logic circuitry 12. In particular, such constructs provide extensive control of instruction decode, conditional testing and branching. As such, elements normally required in PROM-based microsequencers, such as test multiplexers, test masks, program counter multiplexers, condition code multiplexers, and branch control logic circuits, are not required in a PLC 10 of the instant invention.

To further understand the benefits and advantages of a PLC 10 according to the instant invention, five illustrative control tasks using the PLC will now be described: control sequencing, output generation, conditonal testing, branching, and instruction decode.

CONTROL SEQUENCING

The programmable counter 240 is provided for sequencing, state counting and control of the programmable AND array 122, through feedback path 340. In turn, the counter 240 is user-controlled via the programmable AND array 122 (and the control sequence OR array 126, in the embodiment of FIG. 3). The contents of counter 240 can be loaded from AND array 122 (OR array 126 of FIG. 3) and the resulting count used to represent a state, which in conjunction with the AND array 122 (and OR array 124 of FIG. 3) can be used in the generation of output signals by output macrocells 160.

Hence, both Mealy and Moore type state machines are readily implemented by a PLC 100 of the instant invention. As the operation of counter 240 is normally sequential, the operation of the state machine is easier to comprehend and program in software than the PAL sequencers of the prior art.

Loading of the counter 240 provides the branching function of the state machine. The clearing of the counter resets the counter 240 to 00 (Hex) which is the normal starting state of the state machine.

Accordingly, the control structure of a state machine or sequencer implemented by a PLC 100 of the instant invention is controlled by the AND-OR array 122 and 126 combination and is dependent on the present state of the machine, i.e., present contents of counter 240, the input signals to the AND array 122, and the output signals fedback to the AND aray via path 340.

In a representative embodiment, a ten-bit counter 240 provides 1,024 states. However, additional states can be provided by using the contents of the buried registers 200 in determining the present state.

OUTPUT GENERATION

A second major task in state machine design is the generation of the control output signals. By virtue of the programmable AND-OR arrays 12 within the PLC 10 of the instant invention, output signals can readily be generated dependent on the state of the machine and the input signals. For example, suppose a state machine having the states 00 and 01 is to perform the following operation:

| STATE | OPERATION |
|---|---|
| 00 | OUT 01, 03 |
| 01 | IF I3 THEN $\overline{\text{OUT 03}}$ |

By encoding the states 00 and 01, as $\overline{S0}$, $\overline{S1}$ and $\overline{S2}$; and S0, $\overline{S1}$ and $\overline{S2}$, respectively, where S0, S1 and S2 represent the signals generated by counter 240, output signals O1 and O3 can be generated according to the following equations, dependent on signals S0, S1, S2 and their complements and the input signal I3:

$$O1 = \overline{S0} \cdot \overline{S1} \cdot \overline{S2} \text{ and}$$

$$O3 = \overline{S0} \cdot \overline{S1} \cdot \overline{S2} + S0 \cdot \overline{S1} \cdot \overline{S2} \cdot \overline{I3}$$

These latter equations are readily imlemented by the programmable AND-OR array 12, as will be appreciated by those skilled in the art.

CONDITIONAL TESTING

The selection of conditional inputs is programmable in the PLC 100 by way of software and the programmable AND array. The conditional testing can make use of any state(s), or be independent of state, can make use of any combination of inputs, can make use of outputs fedback to the AND array, and can be for any particular length of time.

For example, in a state machine having the states 04 and 05 performing the following conditional testing operations on the input signals $\overline{\text{MREQ}}$, $\overline{\text{CS}}$ and $\overline{\text{RAS}}$:

| STATE | OPERATION |
|---|---|
| 04 | IF $\overline{\text{MREQ}}$ AND $\overline{\text{CS}}$ THEN $\overline{\text{RAS}}$ |
| 05 | IF $\overline{\text{RAS}}$ THEN $\overline{\text{CAS}}$ ELSE GOTO 04 |

By encoding the states 04 and 05 as $\overline{S0}$, $\overline{S1}$ and S2; and S0, S1 and S2, respectively, the conditional testing operations can be implemented by the PLC 10 as:

$$\overline{\text{RAS}} = \overline{\text{MREQ}} \cdot \overline{\text{CS}} \cdot \overline{S0} \cdot \overline{S1} \cdot S2 \text{ and}$$

$$\overline{\text{CAS}} = \overline{\text{RAS}} \cdot S0 \cdot \overline{S1} \cdot S2$$

BRANCHING

Branching is performed by the PLC of the present invention based on the programmable conditional inputs to the programmable AND array 122. Dependent on the present state, as reflected by the contents of counter 240, and the conditional inputs, a LOAD CONTROL signal, and a set of LOAD ADDRESS signals can be generated by the control sequence OR array 126. The latter set of signals representing the state to which a branch is desired. During the next clock cycle, the contents of counter 240 will be set to the desired branch state and on subsequent clock cycles, the count will resume from this state onwards.

15

For example, suppose it is desired to perform the following branching operations:

| STATE | OPERATION |
|-------|-----------|
| 00    | GOTO 03   |
| 01    | IF $\overline{CS}$ THEN GOTO 00 ELSE GOTO 01 |

Continuing with the state-encoding use in the previous examples, these branching operations can be implemented by the programmable counter 240 of PLC 100 as follows:

$$\text{LOAD} = \overline{S2} \cdot \overline{S1} \cdot \overline{S0} + \overline{CS} \cdot \overline{S2} \cdot \overline{S1} \cdot S0 + CS \cdot \overline{S2} \cdot \overline{S1} \cdot S0$$

$$LS2 = 0$$

$$LS1 = \overline{S2} \cdot \overline{S1} \cdot \overline{S0}$$

$$LS0 = \overline{S2} \cdot \overline{S1} \cdot \overline{S0} + \overline{S2} \cdot \overline{S1} \cdot S0 \cdot CS$$

In which the LOAD CONTROL signal is denoted LOAD and the set of LOAD ADDRESS signals are denoted LS2, LS1 and LS0, from most-significant to least-significant, respectively.

As described above, in connection with the counter 240, a dedicated clear function is provided for the counter. Application of the COUNTER CLR signal will cover the contents of counter 240 to be set to ZERO, or another predetermined value, representing the "start" state. An extension of the branching example to perform a "return to start" operation will now be clear to those skilled in the art.

INSTRUCTION DECODE

The instructions for the PLC 10 of the present invention are predecoded by conversion into Boolean equations and stored in this functional logical form in the AND-OR array portion 12. Since the conversion is performed by software, any user-specified application-oriented instruction set can be performed on the PLC 10, unlike prior art PROM-based microsequencers in which a hardware element—a dedicated instruction decode PLA—is used to convert instructions. Furthermore, since the prior art PROM-based microsequencers must convert the instructions from a data format at execution time, such microsequencers operate more slowly than the PLC 10 of the instant invention.

We claim:

1. A method of designing a control sequencer from an integrated circuit device having a programmable AND array responsive to signals applied to external terminals of said device, and having a plurality of registers and a counter, comprising provision-of-an-n-state-machine steps of:
   (a) loading said counter with a programmably selectable initial value by applying signals to said AND array; and
   (b) incrementing or decrementing (modulo n) said counter.

2. An n-state machine design method according to claim 1 further including a state-branch step comprising:

16

(c) loading said counter with a programmably selectable branch value by applying signals to said AND array.

3. An n-state machine design method according to claim 2 wherein said AND array receives feedback signals fedback from said counter and said registers, said step (c) further calling for determining said branch value by a combination of externally-applied signals and said feedback signals.

4. An n-state machine design method according to claim 2 further including a clear step comprising:
   (d) clearing said counter with a predetermined value by applying signals to said AND array.

5. An n-state machine design method according to claim 4 wherein said AND array receives feedback signals fedback from said counter and said registers, said step (d) further calling for clearing said counter based on a combination of externally-applied signals and said feedback signals.

6. An n-state machine design method according to claim 1 wherein said AND array receives feedback signals fedback from said counter and said registers, said step (a) further calling for determining said initial value by a combination of externally-applied signals and said feedback signals.

7. An n-state machine design method according to claim 1 wherein said AND array receives feedback signals fedback from said counter and said registers, said step (b) further calling for incrementing said counter value based on a combination of externally-applied signals and said feedback signals.

8. An n-state machine design method according to claim 4 further including an output-generation step comprising:
   (e) generating output signals based on contents of said counter.

9. An n-state machine design method according to claim 8 said step (e) further calling for generating said output signals based on a combination of externally-applied signals and said contents of said counter.

10. An n-state machine design method according to claim 8 said step (e) further calling for holding a signal level of said generated output signal for a user-selectable period based on said contents of said counter.

11. An n-state machine design method according to claim 8 further including an input-holding step comprising:
    (f) holding a signal level of said signals applied to said AND array for a user-selectable period based on said contents of said counter.

12. An n-state machine design method according to claim 11 further including an extra-buried-register step comprising:
    (g) loading said counter at every clock cycle from an OR array.

13. A method of designing an instruction-driven control sequencer from an integrated circuit device having a programmable AND array responsive to signals applied to external terminals thereof, comprising instruction-decode steps of:
    (a) converting instructions into logical form; and
    (b) storing instructions in said AND array in logical form.

14. A sequencer instruction decode method according to claim 13 wherein said instructions are user-selectable.

15. A method of designing a control sequencer from an integrated circuit device having a plurality of registers, a programmable state counter, a programmable AND array responsive to signals applied to external terminals thereof and signals fedback from said registers and said state counter, and a programmable control sequence OR array, comprising conditional-testing steps of:
  (a) determining levels of programmably-selectable ones of said signals applied to said AND array;
  (b) determining levels of programmably-selectable ones of said signals fedback from said registers; and
  (c) generating signals from said control-sequence OR array based on signal levels determined at steps (a) and (b);

whereby said conditional-testing is made independent of state.

16. A conditional-testing method according to claim 15 further including a state-determining step of:
  (d) determining levels of said signals fedback from said state counter;
  and wherein said step (c) further calls for generating said signals from said control sequence OR array based on signal levels determined at steps (a), (b) and (d);
  whereby said conditional-testing is made dependent on a user-selectable number of states, which can be a partial number of states or all states.

* * * * *